United States Patent [19]

Williams

[11] 4,115,658
[45] Sep. 19, 1978

[54] TWO WAY TELEPHONE AMPLIFIER

[76] Inventor: Richard W. Williams, 2837 S. Raritan, Englewood, Colo. 80110

[21] Appl. No.: 786,335

[22] Filed: Apr. 11, 1977

[51] Int. Cl.² .............................................. H04M 9/08
[52] U.S. Cl. ................................................. 179/1 HF
[58] Field of Search .................. 179/1 HF, 1 H, 1 CN

[56] References Cited

U.S. PATENT DOCUMENTS

| 3,725,585 | 4/1973 | Moniak | 179/1 HF |
| 3,970,786 | 7/1976 | Randmere | 179/1 HF |
| 4,002,860 | 1/1977 | Terai et al. | 179/1 HF |
| 4,025,728 | 5/1977 | Jacobson | 179/1 HF |

Primary Examiner—Kathleen H. Claffy
Assistant Examiner—E. S. Kemeny
Attorney, Agent, or Firm—Richard D. Law

[57] ABSTRACT

A two-way telephone amplifier uses a microphone-speaker switching system with the microphone normally on. Incoming or off-line voice signal causes switching to open the transmit line and close the receive line. Features of the invention include a bridge circuit with transmit and receive lines all connected to one side of the secondary of a telephone line coupling transformer.

7 Claims, 2 Drawing Figures

TWO WAY TELEPHONE AMPLIFIER

BACKGROUND OF THE INVENTION AND PRIOR ART

Telephone amplifiers have been used in the past supplementing normal telephone hand sets, which are not hand-held with such amplifiers. These prior art units may be classified in several groups:

(A) Amplifiers Only

These devices amplify both sides of a conversation over a common loud speaker. The handset is still hand held, and when the amplifier volume is high, feedback results in howls and squeals.

(B) Cradled Handset Amplifier

These instruments require the handset to be placed in a cradle so that the off-line voice is amplified. Some type of accoustical horn in generally necessary to direct the user's voice into the handset transmitter, or mouth piece. The loud speaker of the unit is generally separated from the cradle device and the speaker must be kept low enough to prevent feedback.

(C) Switching Amplifier

The switching amplifier generally contains its own microphone and speaker which are switched on and off alternately in response to voices present. That is, when the voice signals generated by the microphone stops or lowers considerably, then the loud speaker is turned on to hear the conversation from from the other party on the telephone line. This device is limited in the loudness of the loud speaker in order to prevent inadvertant switching, resulting in a breakup of the conversation.

In all of the described amplifiers, the inherent problems deal mostly with the accoustical feedback between the transmit and receive causing unwanted distortion and interruptions of the conversations. Attempts to overcome these defects have resulted mostly in multiple piece assemblies that physically separate the microphone and speaker in order to achieve the necessary accoustical separation and isolation. The results are both poor voice qualities and ungainly appearances. In most cases the party on the other end of the telephone line is greatly disturbed by the unnatural effects of the telephone amplifier.

BRIEF SUMMARY OF THE INVENTION

The present invention includes a microphone-speaker switching system that is controlled by the incoming voice or signal so that the telephone amplifier microphone is active when the other party is not speaking. The unit provides natural sounding conversations at any desired volume, and other party hears the voice and normal background noises in the area of the amplifier.

OBJECTS OF THE INVENTION

Included among the objects and advantages of the invention is to provide a unitized telephone amplifier system for a hands-off telephone use.

Another object of the invention is to provide a incoming or off-line voice controlled unit for telephone conversations.

Yet another object of the invention is to provide a microphone and speaker circuit where the speaker is held off by a shunted switch while the microphone is on, to prevent feedback between them.

Still another object of the invention is to provide an amplified telephone circuit whereby the incoming caller can "capture" the conversation by talking, to switch-on the speaker of the amplifier unit.

A further object of the invention is to provide selected filter networks to shape the voice on-line signal to eliminate hollowness of amplified speaking voice.

An additional object of the invention is to provide a telephone amplifier circuit having switching circuits to compensate background noise levels at a microphone input so as to allow a switching sensitivity independant of local noise levels.

A further object of the invention is to provide a telephone amplifier system having means of interface through a single non-saturating transformer for coupling signals bi-directionallly to a telephone line.

These and other objects and advantages of the invention may be readily ascertained by reference to the following description and appended illustrations:

DESCRIPTION OF THE SPECIFIC EMBODIMENT

Figure 1:
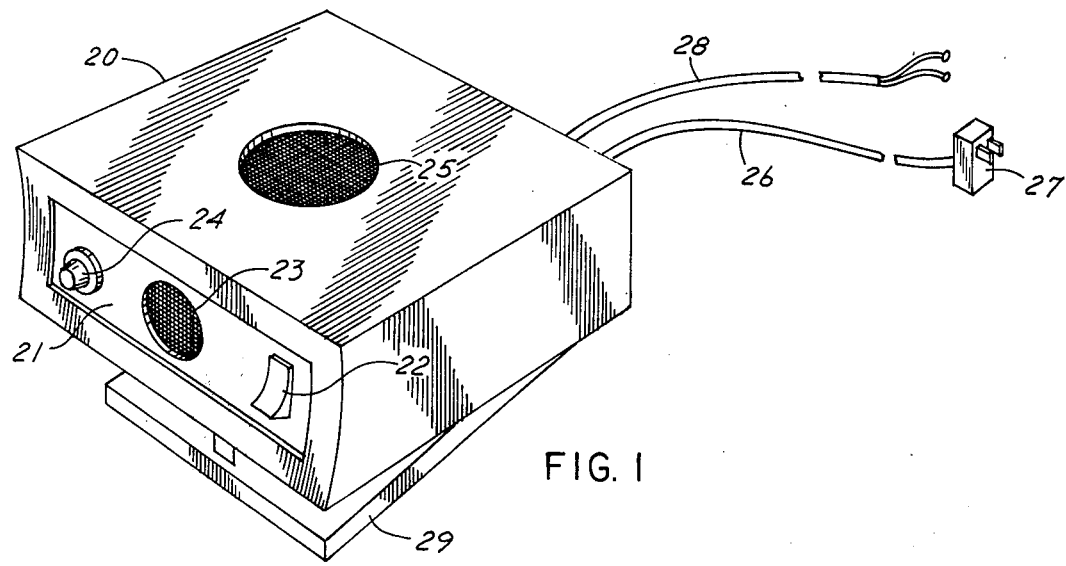
FIG. 1 illustrates a two-way amplifier constructed according to the invention.

As hereinbefore stated, the invention is unitized and includes both a microphone to transmit, on-line, and a speaker to receive, off-line, a telephone conversation with both the speaker and microphone in the same circuitry permitting these components to be mounted in a common housing. As set forth in FIG. 1 of the drawings, this housing may be a well-built, neat appearing, comparatively flat box 20 proportioned such that it can set upon a table or desk at any convenient location. The control face 21 at the front wall of this box may include an on-off switch 22, a microphone head 23 and a volume adjustment knob 24. It was found that a speaker 25 could be positioned at the top of the box to better direct the conversation received over the phone throughout a room so that all persons in the room could effectively hear this conversation, without causing feedback to the microphone.

Several cords will extend from this box 20, a power cord 26 with a suitable plug-in transformer-rectifier 27 for receiving a selected D.C. voltage, from a standard 110 A.C. voltage source. A phone cord 28, having several leads extends to a telephone connector box for connecting the two-way amplifier to a telephone circuit. To complete the unit, a pedestal 29 (or other base) may be provided to hold the box 20 a suitable distance above the top of the table or desk where it is placed, and to direct the microphone a convenient angle for use of the speaker.

It is the purpose of the invention to effect a telephone amplifier system that allows for both natural sounding conversations at any desired speaker volume and a single compact unit that contains both the microphone and speaker, for a total hands free operation. It is of primary importance that the party on the other end of the telephone hear from the amplifier the voice and background noises from the location of the amplifier as near to normal as possible. There is preferably no hollow or barrel effect in the voice being transmitted by the telephone amplifier.

To achieve this natural sound, the invention includes a microphone/speaker switching system that is controlled by the incoming received or off-line voice. The telephone amplifier microphone is normally on or active when there is no off-line signal (or voice). Since the party with the handset on the other end of the line hears only his own voice when he is speaking (amplifier speaker is on at this time) and the amplifier switching turns the speaker off and the microphone back on, the party on the handset never feels "cut off". There is no dead silence on the line. Further, since the "party-on-the-other-end" or off-line signal (with reference to the amplifier unit) is in control of the switching, the off-line party may capture at any time. Thus, he does not feel left out by an electronic device and conversation flows freely and naturally.

This invention also includes in its microphone or on-line circuits carefully selected filter networks to shape or "voice" the on-line signal such that nearly all of the hollowness or barrel effect is eleminated. The result of this filtering action is a transmitted voice that is heard on the other end as clearly and distinctly as if a normal handset were being used in place of the telephone amplifier. Again, this natural sound allows normal free flowing conversation since there are virtually no unusual sounds to inhibit either party to the conversation.

This invention further includes a unitized construction. That is, because the microphone and speaker are never on at the same time (no feedback possible), all components of the telephone amplifier are contained in the same compact housing. This means that a single compact and attractive unit is used in place of the multiple units that require the physical seperation of the microphone and speaker units. Thus a great deal of valuable desk, table, or countertop space is saved.

As a part of this invention, certain physical orientations of the microphone and speaker are included to furhter enhance the communication clearity of the invention. That is, the microphone is oriented to face the user at his most common position relative to the amplifier while the speaker is oriented at right angles to the microphone in a generally upward position; this speaker orientation dispenses the off-line voice such that a more even distribution of the off-line occurs with in the room. This allows other persons in the room to be a party to the conversation and reduces any accustical "hot spots". Again more natural conversation.

Figure 2:
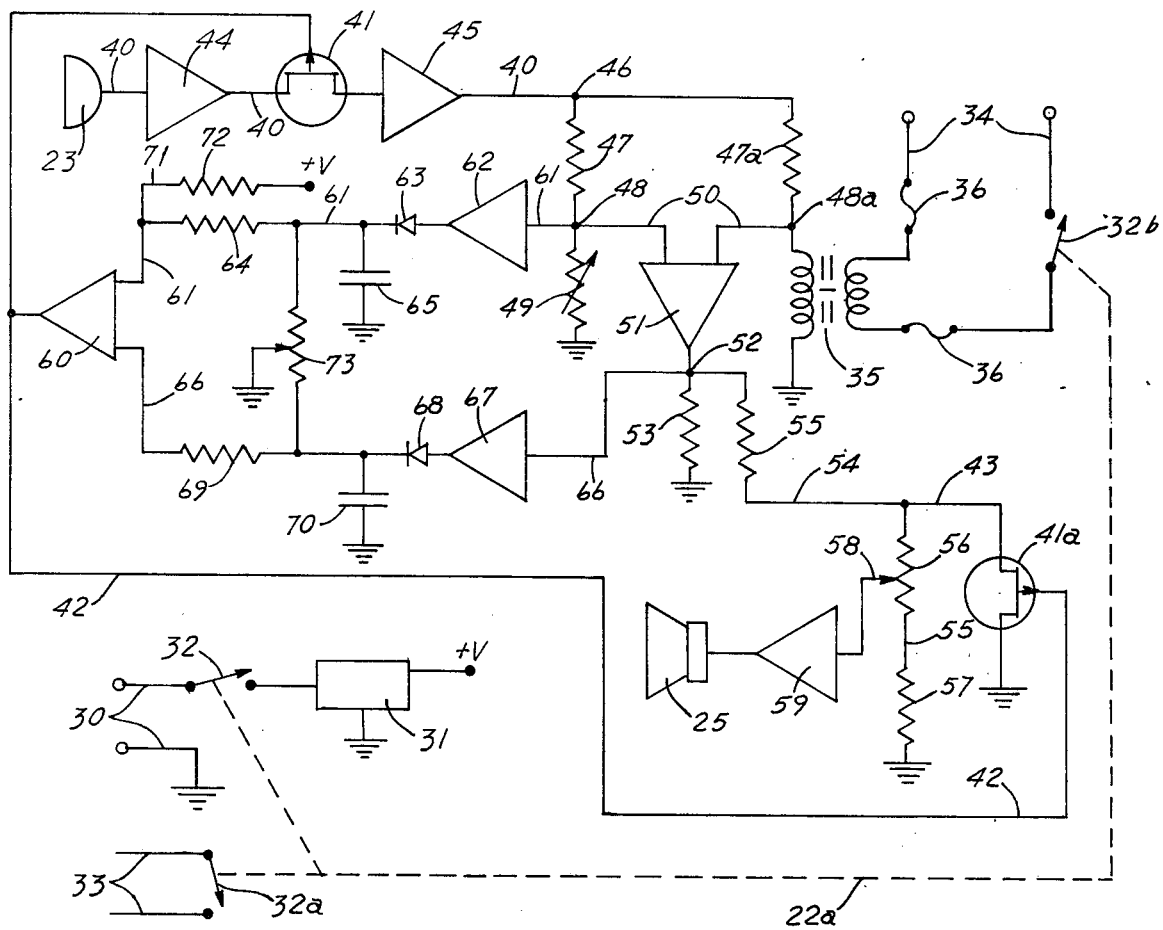
FIG. 2 is a functional circuit diagram for the two-way amplifier.

Referring to FIG. 2, a functional diagram of the circuitry includes several peripheral circuits which will be first described. A power line 30 from a direct current source is directed to a voltage regulator 31 through a switch 32. The regulator 31 provides a positive voltage output +V at a selected level to provide the same to the several components of the main circuit.

Another peripheral circuit includes hold leads 33 to the telephone which close by a switch 32a, the same rendering multiline telephones operative. The third peripheral circuit is a phone line 34, which extends as a loop, to include the primary of a line coupling transformer 35, fuse resistors 36 at each side of the transformer and a switch 32b. The switches 32, 32a and 32b are normally open, when the two-way amplifier is not in use, and close in unison through a common mechanical link 22a, shown in broken lines, by a switch 22, or by suitable relays associated with the switch 22. The operational description accompanying the following description of components assumes that these switches 32, 32a and 32b are closed.

A microphone 23, at turn-on of the switch 32, is amplified in a preamplifier 44 going through a normally closed FET 41 (acting as a switch), connected by line 40, and routed along line 40 through the normally closed electronic switch 41 to the on-line driver 45 which applies the on-line signal to a bridge circuit at junction 46 consisting of resistors 47, 47a, 49 and transformer 35. With the bridge balance resistor 49 adjusted properly, equal signals are present at the inputs to a differential amplifier (IC) 51 from junction 48 and 48a through line 50. The output of 51 is a nulled signal developed across resistor 53 at junction 52. The bridge nulled on-line signal is presented to both an off-line detector (consisting of A.C. amplifier 67 on-line 66, rectifier (diode)68 and capacitor 70) and the speaker amplifier system. The speaker amplifier 59 is held off the line by shunt switch (FET) 41a across lines 42 and 43. Thus no feed back can occur, even if the bridge is improperly balanced. The portion of the off-line signal that is developed across variable resistance 49 is presented on line 61 to the on-line detector (consisting of A.C. amplifier 62 on line 61, diode 63 and capacitor 65). Since the amplitude of the on-line signal presented to the on-line detector is greater than the nulled on-line signal presented to the off-line signal detector, the resulting D.C. outputs to the two detectors are proportionately presented to the inputs of a voltage comparator 60 through line 61 from resistor 64 and through line 66 from resistor 69. Resistor 72 provides a steering bias to the on-line input of the voltage comparitor 60 including resistor 64 and part of variable resistor 73. During this on-line mode of operation, the microphone signals (from microphone 23, line 40 to the IC 44, and the switch 41) are coupled to the telephone line 34, through the special line coupling to transformer 35.

The line coupling transformer 35 has its line side winding D.C. resistance such that it presents a normal D.C. load to the phone line. The A.C. impedance of the transformer is maintained by the use of a gaped core, which prevents saturation of the transformer for all D.C. line currents. Thus, this simple, single component becomes the signal transfer and protective interface with the telephone line. Small resistances are used in each side leg of the line side of the transformer to act as fuseable protectors 36 in extreme abnormal conditions.

The off-line or received signal operation of the two way amplifier is initiated by the voice signal received through the line coupling transformer 35 and developed across its secondary at one input to the differential amplifier 51. Since bridge resistor 47a is connected to the very low impedance output of the IC 45, that end of 47a is essentially at ground, and a full off line signal develops at 48a but none at 48. Therefore, resistor 47a becomes the primary terminating load for the transformer 35. With one end of resistor 47a at signal level and the other end at ground, no off-line signal is developed at the junction 48 of resistors 47 and 49. The result is the off-line signal is amplified across the output load of the differential amplifier 51 and the signal goes through resistor 55, line 43, variable resistor 56 (volume controller 58) and ground resistor 57 through the IC 59 and speaker 25. This amplified signal is detected by the off-line detector (line 66) and over-comes the bias input supplied to the voltage comparator 60 at the junction 61, by resistor 72 along line 71. When the off-line input to the comparator line 66 exceeds the bias and on-line input line 61 states, the change of state of comparator 60 reverses the state of switches 41 and 41a such that the microphone circuit is turned off and the speaker amplifier is turned on for the duration of the off-line signal.

When the off-line signal stops, the off-line input to the voltage comparator drops and the comparator returns to normal state. Thus the speaker is turned off and the microphone is turned back on at the end of the off-line signal.

The switching sensitivity of the two-way telephone amplifier is basically controlled by variable resistor 73 across lines 61 and 66. This adjustment allows the detected on-line and off-line signals to be adjusted such that the ratio of the two signals will cause switching to take place at such a level of off-line signal as may be required for good conversation responses. If the switching is made too sensitive the amplifier will "lock up" on the incoming line noise. On the other hand, if the switching sensitivity is too low, the amplifier will either not switch modes at all or will miss the first syllables or words of the off-line voice. With this adjustment available to the user, the two-way telephone amplifier may be adusted for better operation in accordance with the local telephone line conditions. The adjustable resistor 73 controls the discharge time of the capacitors 65 and 70, and the circuit has time to pickup the initiated voice signal. This controls the voice signal at 52 so as to cut out noise or increase sensitivity to low voices. In the speaker circuit, the resistor 57 provides a minimum volume level, particularly since a zero volume level is not desirable.

The switching between on-line voice and off-line voice is on a proportional gain as determined by the comparitor circuit. The sensitivity is adjusted by the variable resistor 73. The proportional gain between the two is the difference between the on-line detection and off-line detection at a constant mic input. Thus at quiet background the difference is slight, at higher background noises the difference is slightly greater and at high background noise the difference is greater. This permits the switching by normal voice even with high background noise. The proportional difference may be determined by a plot of on-line detection (a straight line) of comparator input versus mic input and a plot of the off-line detection (a straight line) of the graph. The lines are sloped and diverge slightly from quiet background to noisy background. Thus the switching differential is only slightly different at the different background noise levels permitting normal voice conversation at the different noise levels.

What is claimed is:

1. A telephone amplifier system comprising
   (a) signal transfer means from and to a telephone line including a coupling transformer connected for both transmit and receive signals at one side of transformer secondary coil;
   (b) a transmit amplifier circuit and a receive amplifier circuit connected to said one side,
   (c) normally on switching means in said transmit amplifier circuit holding the same closed in absence of a received signal,
   (d) bridge circuit means between said one side and said transmit amplifier circuit and said receive amplifier circuit,
   (e) a differential amplifier connected in said bridge circuit, and
   (f) a comparator circuit means for closing said receive amplifier circuit on receipt of a received signal and opening said transmit amplifier circuit.

2. A telephone amplifier according to claim 1, wherein an averaged transmit signal and an averaged receive signal is received by said comparator circuit.

3. A telephone amplifier according to claim 1, wherein said coupling transformer is a gapped core, non-saturating, untapped secondary coil transformer.

4. A telephone amplifier according to claim 1, wherein a variable resistor between the transmit signal detector and the receive signal detector controls the switching sensitivity of the receive signal on a proportional gain between received and transmitted signals.

5. A telephone amplifier according to claim 4, wherein the switching differential between the transmit signal detector and the receive signal detector is essentially the same at various levels of background noise.

6. A telephone amplifier according to claim 1, wherein both transmit and received signals are monitored simultaneously and bridge circuit and differential amplifier automatically adjust the comparator imprints to compensate for the background noise of both signals.

7. A telephone amplifier according to claim 1, wherein said normally on switching means is an F. E. T.

* * * * *